United States Patent [19]

Yamamoto

[11] 4,410,915

[45] Oct. 18, 1983

[54] APPARATUS FOR PROTECTING AN IMAGE PICKUP TUBE IN A TELEVISION CAMERA

[75] Inventor: Kazumi Yamamoto, Yokohama, Japan

[73] Assignee: Ikegami Tsushinki Co. Ltd., Tokyo, Japan

[21] Appl. No.: 360,982

[22] Filed: Mar. 23, 1982

[30] Foreign Application Priority Data

Jun. 17, 1981 [JP] Japan .................................. 56-92125

[51] Int. Cl.³ .............................................. H04N 5/26
[52] U.S. Cl. .................................................... 358/228
[58] Field of Search .......................................... 358/228

[56] References Cited

U.S. PATENT DOCUMENTS 2,417,506  3/1947  Lamb .................................. 358/228

FOREIGN PATENT DOCUMENTS

| 55-28626 | 2/1980 | Japan | 358/228 |
| 55-46684 | 4/1980 | Japan | 358/228 |
| 55-46686 | 4/1980 | Japan | 358/228 |
| 55-135471 | 10/1980 | Japan | 358/228 |

Primary Examiner—John C. Martin
Assistant Examiner—Michael D. Parker
Attorney, Agent, or Firm—Spencer, Kaye & Frank

[57] ABSTRACT

In a television camera having an image pickup tube and an iris for controlling an amount of incident light upon the pickup tube both in an automatic control mode and in a manual control mode by selectively actuating a mode selection switch, an additional switch is connected in parallel with the mode selection switch and when a main power switch is made off, said additional switch is closed for a given time period during which the iris is driven into its minimum aperture state.

6 Claims, 3 Drawing Figures

APPARATUS FOR PROTECTING AN IMAGE PICKUP TUBE IN A TELEVISION CAMERA

BACKGROUND OF THE INVENTION

The present invention relates to an apparatus for protecting an image pickup tube in a television camera.

In usual television camera, there is provided an auto iris control system for driving automatically an iris mechanism in such a manner that an output video signal from the camera has always a desired level even if an amount of incident light emanating from an object to be picked up fluctuates.

When the picking up operation has been finished, the iris mechanism should be driven into a fully closed condition, i.e. the minimum aperture condition or a filter having the highest density should be inserted in an optical path. If such an operation is forgotten, a photoelectric surface, e.g. a target of the pickup tube is unnecessarily irradiated by undesired light and a large amount of electrostatic charge might be stored therein. Therefore, the target might be deteriorated due to fatigue and in an extreme case, the target might be burnt. Then, it is impossible to derive the correct video signal from which an image of good quality is reproduced.

In order to avoid the above mentioned drawback, the inventor has proposed an apparatus for protecting the pickup tube in which the iris mechanism is automatically driven into the minimum aperture condition in response to a switch off of a main power supply. Usually, the television camera further comprises a manual iris control in which the iris mechanism can be manually driven by rotating an iris ring. Such a manual iris control is necessary for picking up special scenes. For instance, picking up a subject against the light and picking up a small bright subject in a dark background. In case of manual control, the iris mechanism is disconnected from an iris control circuit and thus, when the picking up operation is finished while the manual iris control has been selected, the above mentioned automatic protecting mechanism could not work, because a motor in the iris mechanism is not energized. Therefore, the iris is remained an open condition and thus, the target of the pickup tube might be damaged or deteriorated by the light impinging upon the target through the opened iris.

SUMMARY OF THE INVENTION

The present invention has for its object to provide a novel and useful apparatus for protecting a pickup tube in a television camera, which can obviate the above mentioned drawback of the known apparatus and can protect the pickup tube against deterioration and damage by shielding an incident light in response to the switch-off of the main power supply even when the iris control is effected manually.

According to the invention, an apparatus for protecting a pickup tube in a television camera comprises means for controlling an amount of incident light upon the pickup tube;

first switching means for driving said light controlling means in an automatic control mode and a manual control mode, in the automatic control mode, the light controlling means being so controlled that a video signal supplied from the pickup tube has a given signal level;

second switching means connected in parallel with said first switching means, said second switching means being normally opened;

means for generating a driving signal for closing said second switching means for a given time period in response to a switch-off of a main power supply; and means for generating a controlling signal in response to the switch-off of the main power supply, said controlling signal being supplied through said second switching means to said light controlling means so that the light impinging upon the pickup tube is decreased or shielded.

DESCRIPTION OF THE PREFERRED EMBODIMENTS

Figure 1:
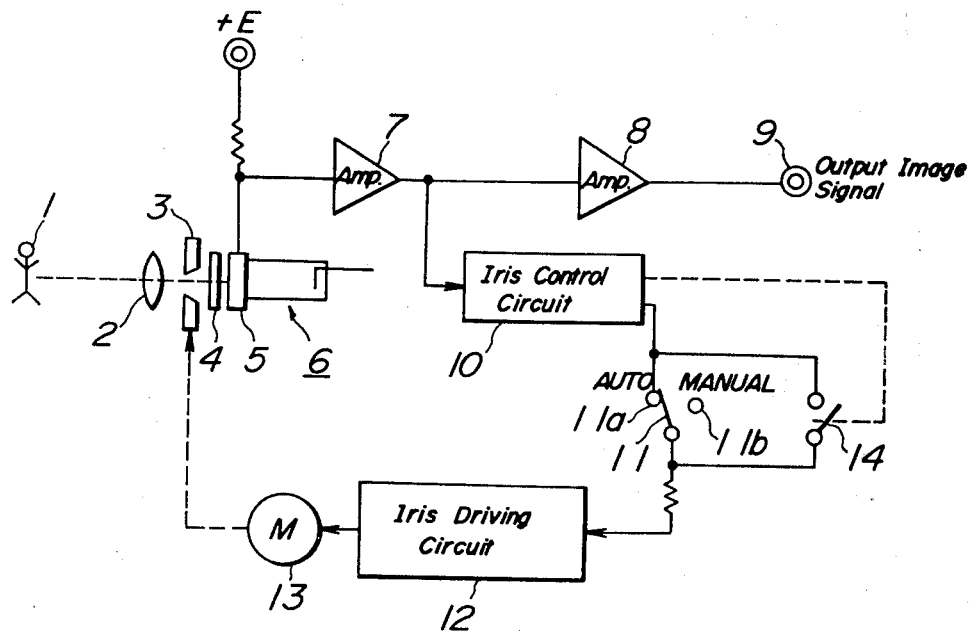
FIG. 1 is a block diagram showing a principal construction of the protecting apparatus according to the invention.

FIG. 1 is a block diagram showing a principal construction of the pickup tube protecting apparatus according to the invention. An image of an object 1 to be picked up is formed via an objective lens 2, an iris 3 and a filter 4 on a target 5 of a pickup tube 6. The image on the target 5 is converted in an electrostatic charge image which is then read out by an electron beam scanning the target. A picture signal thus read out is amplified by first and second video amplifiers 7 and 8 and the amplified video signal is supplied to an output terminal 9. The video signal from the first video amplifier 7 is further supplied to an iris control circuit 10. In the iris control circuit 10, an average value or a peak value of the video signal is derived and then is compared with a reference value to produce a difference therebetween as an iris control signal. The iris control signal thus produced is then supplied through an iris control mode selection switch 11 to an iris driving circuit 12 which drives a motor 13 coupled to the iris 3. The switch 11 comprises a first contact 11a denoted as "AUTO" and a second contact 11b denoted as "MANUAL". When the switch 11 is driven into the auto contact side as illustrated in FIG. 1, the iris control signal from the iris control circuit 10 is supplied to the iris driving circuit 12 and the iris 3 is driven automatically in such a manner that the amount of the incident light upon the pickup tube 6 is adjusted to a predetermined value. Contrary to this, when the switch 11 is changed into the manual contact side, the iris control signal is no more supplied to the iris driving circuit 12 and the iris 3 can be adjusted manually by rotating an iris ring.

The iris control circuit 10 further comprises a circuit which detects a switch-off action of a main power supply and produces an iris close signal by means of which the iris 3 is driven into the minimum aperture position. In this manner, when a power switch is made off, the iris 3 is automatically driven into the minimum aperture position in which the amount of the incident light upon the pickup tube 6 becomes minimum. In this manner, the pickup tube 6 and particularly its target 5 can be protected against the deterioration and damage.

It is apparent that the above mentioned protecting action can be performed only when the switch 11 is driven into the auto contact side 11a. However, in an actual usage, it cannot be always said that the power switch is made off while the switch 11 has been driven into the auto contact side. Therefore, the above protecting action is not effected at all, when the switch 11 is driven into the manual contact side. Then the iris 3 is stopped under such a condition that a substantial amount of light may impinge upon the target 5 of the pickup tube 6, and the target 6 might be damaged or deteriorated to a great extent.

According to the invention, in order to avoid such a drawback, a normally opened switch 14 is connected in parallel with the first switch 11. The normally opened switch 14 is closed by the iris control circuit 10, when the circuit 10 detects the switching-off action of the power switch. Therefore, even if the switch 11 has been switched into the manual control side when the power switch is made off, the iris close signal from the iris control circuit 10 is correctly supplied to the iris driving circuit 12 through the switch 14 and the iris 3 is effectively driven into the minimum aperture condition. In this manner, according to the invention, the target 5 of the pickup tube 6 can be always protected against the deterioration and damage due to the unnecessary irradiation of the light upon the target 5.

Figure 2:
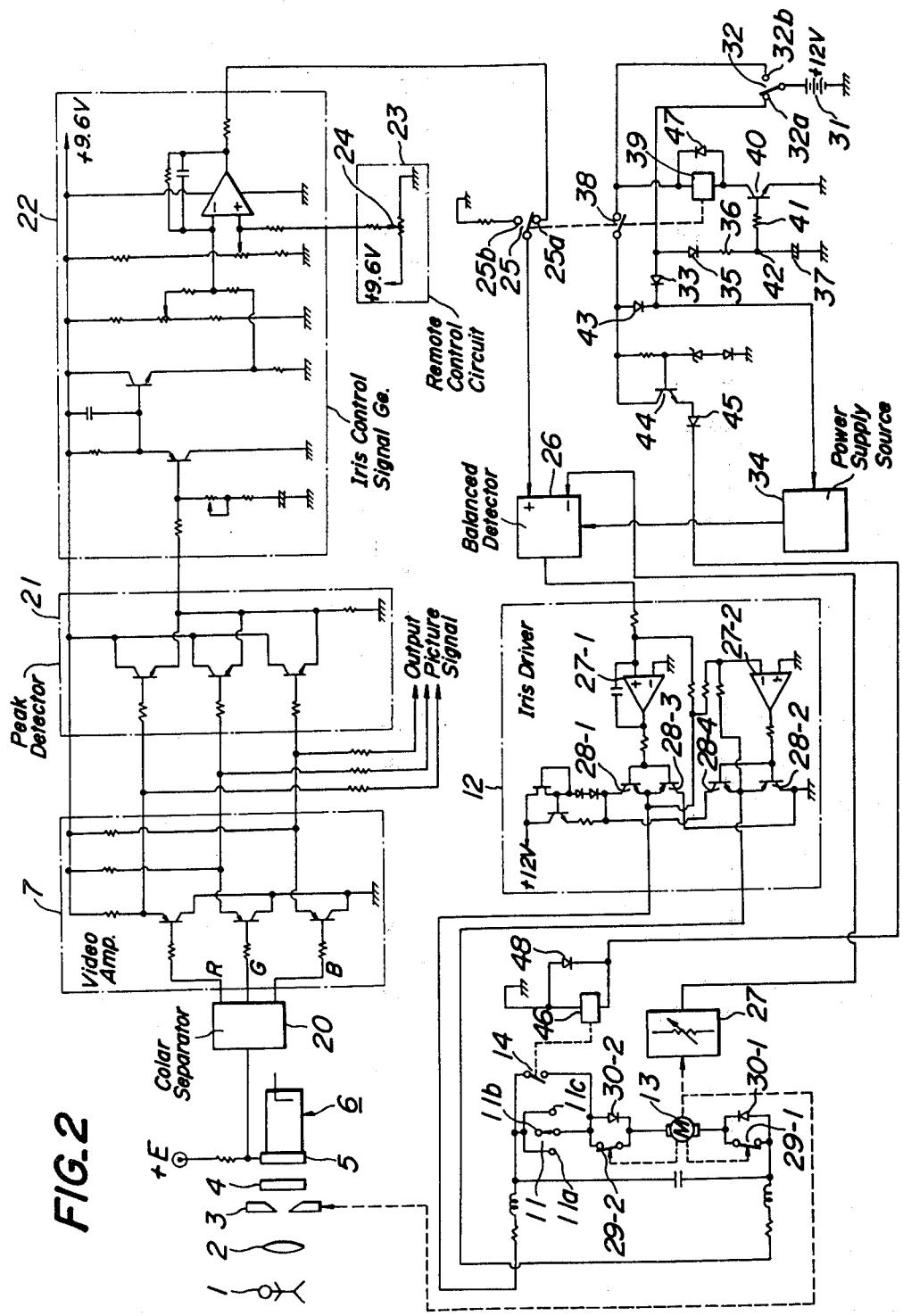
FIG. 2 is a circuit diagram illustrating an embodiment of the apparatus according to the invention.

FIG. 2 is a circuit diagram showing an embodiment of the protecting apparatus according to the invention. In FIG. 2, parts similar to those shown in FIG. 1 are denoted by the same reference numerals used in FIG. 1. In the present embodiment, the pickup tube 6 constitutes a color television camera. A color picture signal supplied from the pickup tube 6 is separated by a color separating circuit 20 into red (R), green (G) and blue (B) color signals. These color signals are amplified by a video amplifier circuit 7. The amplified color signals are supplied to a peak detector 21 and a peak value is detected. The peak value of the video signal is supplied to an iris control signal generator 22 and is compared therein with a predetermined reference value. When the amount of the incident light is excessive, there is produced an iris control signal by means of which the iris 3 is driven into a smaller aperture condition, but when the incident light is weak, there is generated the iris control signal for driving the iris 3 into a larger aperture condition. To the iris control signal generating circuit 22 is also connected a remote control circuit 23 comprising a potentiometer 24. By adjusting the potentiometer 24 manually, it is possible to drive the iris 3 into any desired aperture condition.

The iris automatic control signal from the circuit 22 is supplied via one contact 25a of a switch 25 to one input of a balanced detection circuit 26. The other contact 25b of the switch 25 is connected to the earth. An output of the balanced detection circuit 26 is supplied via an iris driving circuit 12 to an iris driving motor 13 which drives the iris 3. There is further provided an iris position detecting circuit 27. This circuit 27 may be a potentiometer having a slidable arm coupled with the iris driving mechanism. An iris position signal from the iris position detecting circuit 27 is supplied to the other input of the balanced detection circuit 26.

The balanced detection circuit 26 detects a balanced condition between the iris automatic control signal and the iris position signal and produces an iris driving signal having such a polarity that the motor 13 is driven into a given direction until the iris control signal and the iris position signal become identical with each other. When the unbalanced output signal from the balanced detection circuit 26 has a positive polarity, outputs from the operational amplifiers 27-1 and 27-2 in the iris driving circuit 12 become positive and negative, respectively. Then transistors 28-1 and 28-2 are mode conductive and transistors 28-3 and 28-4 are cut off. Therefore, the current passes through the motor 13 in one direction by means of the conducting transistors 28-1 and 28-2 and the iris 3 is driven into the larger aperture condition which permits the incidence of a larger amount of light upon the pickup tube 6. Contrary to this, when the output from the balanced detection circuit 26 is negative, transistors 28-1, 28-2 and 28-3, 28-4 are cut off and conducted, respectively due to negative and positive outputs from the operational amplifiers 27-1 and 27-2. Therefore, the current flows through the motor 13 in the opposite direction to rotate the motor 13 in the reverse direction, so that the iris 3 is driven into the smaller aperture condition.

One input terminal of the motor 13 is connected to one output terminal of the iris driving circuit 12 via a parallel circuit of a normally closed limit switch 29-1 and a current blocking diode 30-1 and the other input of the motor 13 is connected to the other output terminal of the iris driving circuit 12 through a parallel circuit of a normally closed limit switch 29-2 and a current blocking diode 30-2 and further through a parallel circuit of an iris control mode selecting switch 11 and a normally opened switch 14. The limit switches 29-1 and 29-2 are provided to detect the extreme aperture conditions of the iris. When the iris is opened to a full extent, one of the limit switches is made opened and when the iris is closed into its minimum aperture condition, the other limit switch is made opened. The mode selection switch 11 has three contacts, i.e. an automatic control contact 11a, a manual control contact 11b and a remote control contact 11c. When the switch 11 is driven into the manual and remote control contacts 11a and 11c, the iris 3 is adjusted in accordance with the iris control signal supplied from the iris control signal generating circuit 22. Contrary to this, when the switch 11 is changed into the manual control contact 11b, the motor 13 is disconnected from the iris driving circuit 12 and the iris 3 can be manually adjusted by directly rotating an iris ring.

The television camera comprises a direct current supply source 31 having a negative terminal connected to the earth and a positive terminal connected to a power switch 32. An "ON" contact 32a of the power switch 32 is connected via a diode 33 to a power supply generating circuit 34 which applies a given supply voltage to the balanced detection circuit 26. The contact 32a is connected to the earth by means of a diode 35, a resistor 36 and a capacitor 37. The contact 32a of the power switch 32 is further connected to various stable supply voltage generating circuits not shown for producing various supply voltages for various circuit elements. An "OFF" contact 32b of the power switch 32 is connected to a relay contact 38 and to the earth via a relay 39 and a collector-emitter path of a switching transistor 40. The relay 39 drives the switch 25 and the contact 38. A base electrode of the switching transistor 40 is connected by means of a resistor 41 to a junction point 42 of the resistor 36 and the capacitor 37. The relay contact 38 is connected to the power supply voltage generating circuit 34 via a diode 43 and to the earth by means of an collector-emitter path of a transistor 44, a diode 45 and a relay 46 for driving the normally opened switch 14. In parallel with the relays 39 and 46 are connected diodes 47 and 48 for absorbing surge voltage.

Now the operation of the apparatus according to the invention will be explained. During the picking up operation, the power switch 32 and the other switches and contacts are driven into positions shown in the drawing. Since the power supply voltage generating circuit 34 is connected to the power supply source 31 through the "ON" contact 32a of power switch 32, the given power supply voltage is applied to the balanced detection circuit 26. Therefore, the automatic iris control can be effected if the mode selection switch 11 is driven into the automatic control contact 11a. Under such a condition, the iris 3 is automatically driven into an optimum aperture position for adjusting the amount of the incident light to such a value that the video signal having a desired amplitude can be obtained. When the switch 11 is driven into the remote control circuit 11c, the iris 3 can be adjusted by manually operating the potentiometer 24 so as to attain any desired condition of the incident light in regardless to the amplitude of the video signal.

When the mode selection switch 11 is driven into the manual control contact 11b, the connection between the iris driving circuit 12 and the motor 13 is interrupted and the iris 3 can be adjusted at will by manually rotating the iris ring. While the power switch 32 is driven into the "ON" contact 32a, the capacitor 37 has been charged via the diode 35 and resistor 36, and the switching transistor 40 is cut off, because its collector electrode is disconnected from the positive terminal of the d.c. power supply source 31.

After the picking up operation has been finished when the power switch 32 is changed into the "OFF" contact 32b, the switching transistor 40 is made conductive, because its collector is connected to the power supply source 31 and the capacitor 37 is discharged by means of the resistor 41. Then the relay 39 is energized and the relay switch 25 is connected to the contact 25b and the relay contact 38 is closed. Therefore, to the one input of the balanced detection circuit 26 is applied the earth potential. At the same time, the relay 46 is energized via the transistor 44 and diode 45 and the relay contact 14 is closed. Moreover, since the power supply voltage generating circuit 34 is connected to the positive terminal of the power supply source 31 by means of the "OFF" contact 32b of the power switch 32, the relay contact 38 and the diode 43, the given supply voltage is applied to the balanced detection circuit 26. When the earth potential lower than the iris position signal is applied to the balanced detection circuit 26, the circuit 26 produces the control signal of negative polarity and the transistors 28-3 and 28-4 are made conductive. Then the current flows through the motor 13 by means of the contact 14 closed by the relay 46 in the reverse direction and thus, the iris 3 is driven into the minimum aperture condition. When the iris 3 is closed to a full extent, one of the limit switches 29-1 and 29-2 is made opened and the motor 13 is deenergized.

When the base potential of the switching transistor 40 becomes substantially equal to the emitter potential thereof due to the discharge of the capacitor 37, the transistor 40 is cut off and the relays 39 and 46 are deenergized. Therefore, the switches 25, 38 and 14 are changed into the positions shown in FIG. 2. In this manner, the television camera is set completely in the reset condition, while the iris has been driven into the minimum aperture condition and thus, the pickup tube can be effectively protected against the deterioration and damage.

It should be noted that the switching transistor 40 should be remained conductive over a time period during which the iris 3 can be driven from the maximum aperture state to the minimum aperture state. Usually this time period is about five seconds and can be determined by suitably selecting a time constant of the circuit of the resistor 41 and capacitor 37.

Figure 3:
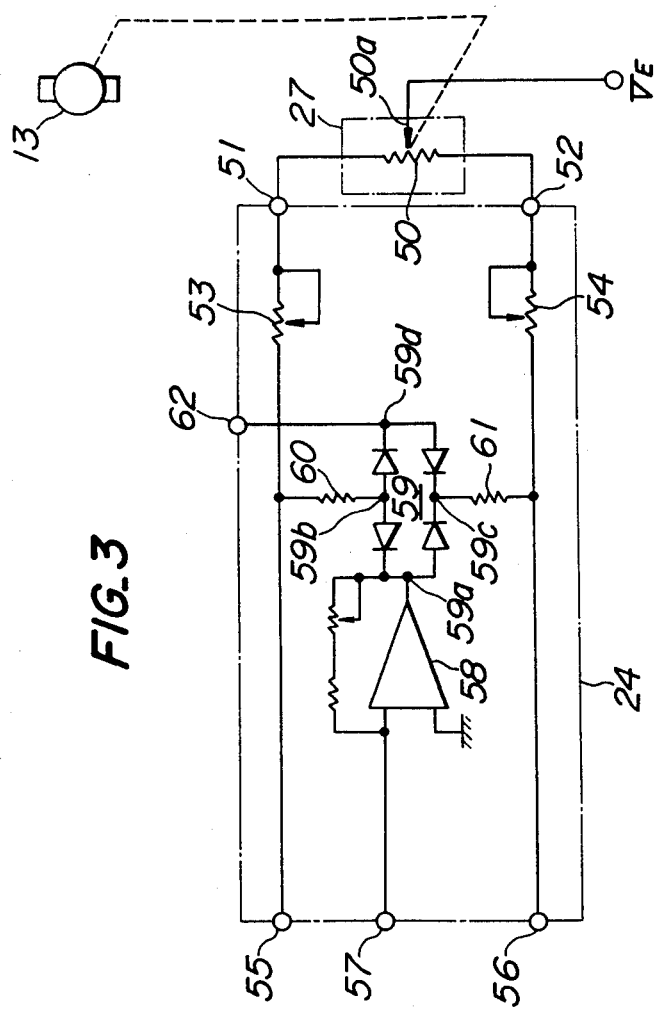
FIG. 3 is a circuit diagram of a balanced detection circuit provided in the apparatus shown in FIG. 2.

FIG. 3 is a circuit diagram showing an embodiment of the balanced detection circuit 26 and the iris position detecting circuit 27 provided in the apparatus shown in FIG. 2. The iris position detecting circuit 27 comprises a potentiometer 50 having a slidable contact 50a coupled with the motor 13. The potentiometer 50 is connected across input terminals 51 and 52 of the balanced detection circuit 26. These input terminals are connected through variable resistors 53 and 54 to supply voltage terminals 55 and 56, respectively. The iris control signal from the circuit 22 is supplied through a fifth input terminal 57 to one input of a differential amplifier 58 having the other input connected to the earth. To an output of the differential amplifier is connected a junction point 59a of a diode bridge circuit 59. Junction points 59b and 59c of the diode bridge circuit are connected to the third and fourth input terminals 55 and 56, respectively via resistors 60 and 61. A junction point 59d of the diode bridge circuit is connected to an output terminal 62 at which the iris control signal appears in accordance with a difference between the iris position signal and the iris control signal.

The present invention is not limited to the embodiment explained above, but may be modified in various ways within the scope of the invention. For instance, not only the iris, but also the filter mechanism may be automatically driven into the optical path in response to the switch-off operation of the power switch. For instance, an opaque filter is provided in a rotating filter disc having a plurality of filters and the opaque filter is driven automatically into the optical path in response to the switch off of the power switch. This filter disc may be rotated by the iris driving motor, but it is preferable to provide a separate motor and its driving circuit for driving the filter disc. In such a case, even if one of the iris driving mechanism and the filter driving mechanism would be inoperative, the pickup tube can be still protected by the other mechanism. Moreover, it is possible to provide only the filter driving mechanism. Furthermore, there may be provided a separate driving source such as a solenoid for driving the iris and/or filter in response to the switch off of the power switch. The iris mechanism may be biased mechanically in an iris closing direction and the iris may be closed in response to the switch off of the power switch. In such a case an electromagnetic clutch may be interposed between the iris and the motor. Furthermore, the switching transistor 40 may be replaced by the switching element and the relay 46 and its contact 14 may be replaced by a semiconductor switching element. A shutter may be provided in front of the pickup tube and may be automatically closed in response to the switch off of the power switch. It is a matter of course that the present invention may be equally applied to a black and white television camera.

According to the invention, the amount of light incident upon the pickup tube can be automatically reduced in response to the switch off of the power switch and thus, the pickup tube can be effectively protected against the deterioration and damage due to unnecessary irradiation and the television camera can be used stably for a long time.

What is claimed is:

1. An apparatus for protecting a pickup tube in a television camera comprising
    means for controlling an amount of incident light upon the pickup tube;
    first switching means for driving said light controlling means in an automatic control mode and a manual control mode, in the automatic control mode, the light controlling means being so controlled that a video signal supplied from the pickup tube has a given signal level;
    second switching means connected in parallel with said first switching means, said second switching means being normally opened;
    means for generating a driving signal for closing said second switching means for a given time period in response to a switch-off of a main power supply; and
    means for generating a controlling signal in response to the switch-off of the main power supply, said controlling signal being supplied through said second switching means to said light controlling means so that the light impinging upon the pickup tube is decreased or shielded.

2. An apparatus according to claim 1, wherein said first switching means drives said light controlling means into a remote control mode in which the light controlling means can be controlled from a remote position.

3. An apparatus according to claim 1, wherein said incident light controlling means comprises an iris, a motor for driving the iris and a circuit for driving the motor.

4. An apparatus according to claim 3, wherein said circuit of the incident light controlling means comprises a circuit for detecting a position of the iris to produce an iris position signal, a balanced detection circuit for receiving said iris position signal and the iris control signal to produce an iris driving signal in accordance with a difference between said iris position signal and iris control signal, and an iris driving circuit for receiving said iris driving signal to generate a current passing through said motor in a direction in accordance with a polarity of said iris driving signal.

5. An apparatus according to any one of claims 1, 2, 3 or 4 wherein said means for generating the driving signal for said second switching means comprises a switching transistor, an RC circuit for conducting the switching transistor for the given time period in response to the swich-off of the main switch, and a relay connected in series with said switching transistor.

6. An apparatus according to claim 5, wherein said controlling signal generating means comprises a switch driven by said relay and having a first contact connected to an iris control signal generating circuit and a second contact connected to a fixed potential, and when the main switch is made off, said switch is driven into the second contact.

* * * * *